United States Patent [19]

Shimamura et al.

[11] Patent Number: 4,594,977
[45] Date of Patent: Jun. 17, 1986

[54] SECONDARY AIR SYSTEM FOR INTERNAL COMBUSTION ENGINE WITH DECELERATION CONTROL

[75] Inventors: Haruo Shimamura; Fumio Yatabe; Kunio Noguchi; Tomohiko Kawanabe, all of Saitama, Japan

[73] Assignee: Honda Giken Kogyo Kabushiki Kaisha, Tokyo, Japan

[21] Appl. No.: 676,647

[22] Filed: Nov. 30, 1984

[30] Foreign Application Priority Data

Nov. 30, 1983 [JP] Japan ................. 58-226418

[51] Int. Cl.$^4$ ............................. F02M 23/08
[52] U.S. Cl. ......................... 123/327; 123/587
[58] Field of Search ................. 123/327, 585–589

[56] References Cited

U.S. PATENT DOCUMENTS 4,483,308 11/1984 Hasegawa ................. 123/589
4,495,922 1/1985 Fujimura et al. ......... 123/587
4,503,834 3/1985 Hasegawa ................. 123/589

FOREIGN PATENT DOCUMENTS 58-170844 10/1983 Japan ..................... 123/327

Primary Examiner—William A. Cuchlinski, Jr.
Attorney, Agent, or Firm—Lyon & Lyon

[57] ABSTRACT

A secondary air intake system for adding air to the intake of an internal combustion engine includes an air control valve for changing the open area of a secondary air intake passage. The air control valve is opened and closed from a first and second pressure supply means. A first pressure supply means gradually supplies the first and second control pressure to operate the air control valve and open and close the secondary air intake passage in response to an air-fuel ratio signal. The first pressure supply means also supplies the second control pressure independent of the air-fuel ratio signal during a predetermined engine operating state. A second pressure supply means supplies the second control pressure separately of the first pressure supply means during a predetermined engine operating state.

8 Claims, 5 Drawing Figures

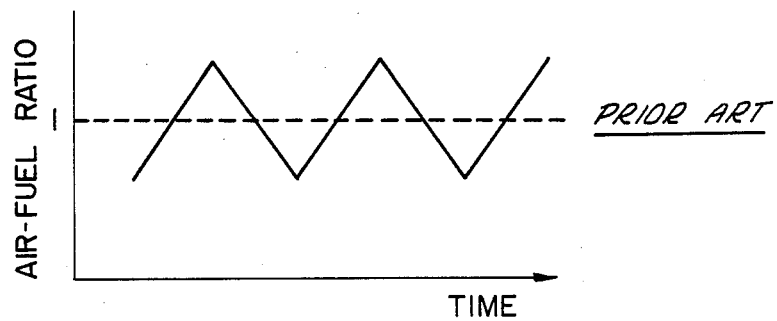
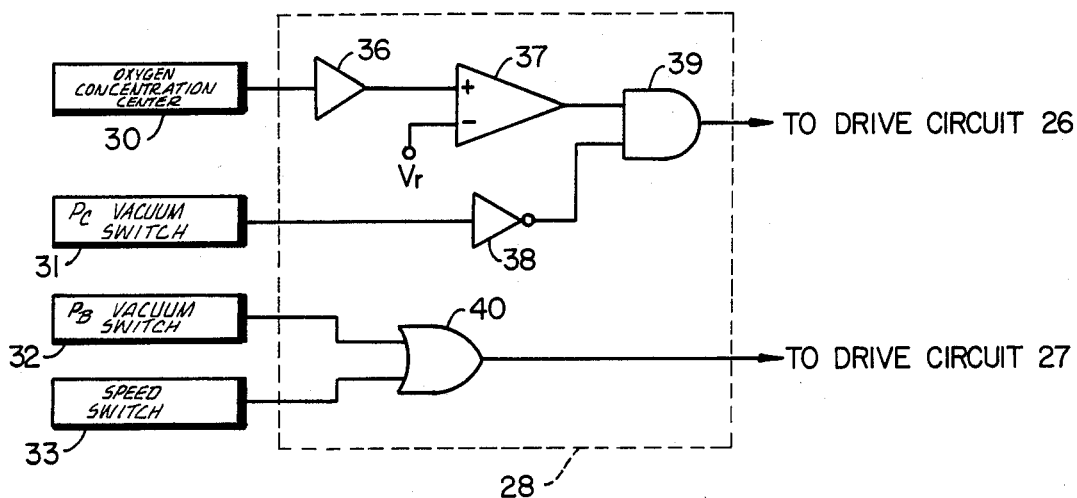
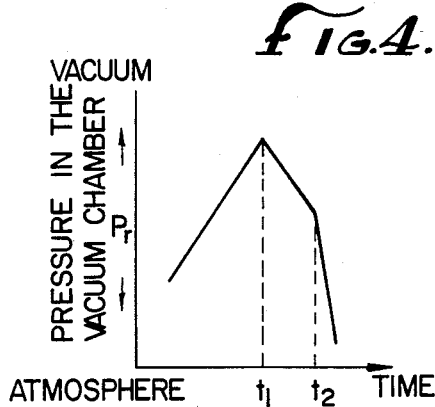
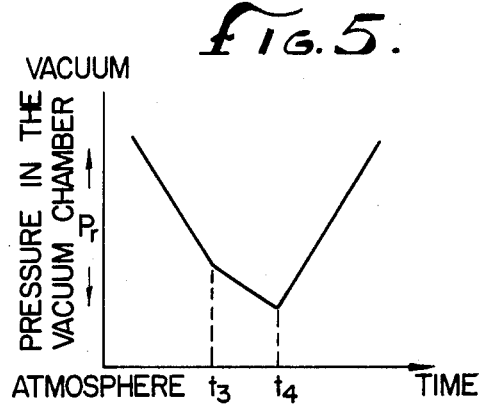

SECONDARY AIR SYSTEM FOR INTERNAL COMBUSTION ENGINE WITH DECELERATION CONTROL

In internal combustion engines having a three-way catalytic converter for cleaning the exhaust gas, the airfuel ratio of the air-fuel mixture ideally is controlled to the vicinity of the stoichiometric ratio of 14.7 to 1.

One prior secondary air intake system is disclosed which has an air control valve disposed in a secondary intake air passage having communication with the inside of an intake manifold downstream of a throttle valve. The air-fuel ratio is measured in the exhaust to generate an air-fuel ratio signal. The air-fuel ratio signal provides a first control pressure for opening the air control valve and a second control pressure for closing the air control valve. The open area of the secondary intake air passage is gradually increased or decreased in accordance with the air-fuel ratio signal.

The first control pressure and the second control pressure are switched to alternately communicate through a three-way electromagnetic valve to the pressure receiving chamber of the air control valve. The first and second control pressures are supplied to the three-way electromagnetic valve through an orifice. A surge tank is disposed in the pressure supply passage to suppress pressure pulsations. The opening increasing and decreasing rates of the air control valve are set at a constant by the diameter of the orifice and by the capacity of the surge tank. The quantity of the secondary air to be supplied to the engine is increased and decreased so that the air-fuel ratio of the supply mixture is gradually increased and decreased in the vicinity of the stoichiometric value of one as shown in FIG. 1.

In the prior secondary air intake system having the construction described above the engine combustion becomes unstable when the engine is lightly loaded. This occurs when the engine is decelerating since the air-fuel ratio feedback control is inoperative, and an open loop control continues to enrich the engine. In addition, when the running state of the engine is shifted to a decelerating state as a result of abrupt closure of the throttle valve there is a time delay before the pressure receiving chamber reaches the second control pressure to fully close the air control valve. Although this time delay can be reduced by setting the opening decreasing rate at a high value, this causes a hunting of the control relative to the stoichiometric ratio. Therefore, the opening decreasing rate is set at a relatively low value. But since the flow rate of the intake air is reduced to a small value due to the closure of the throttle valve when decelerating this may cause deterioration in the engine operation. The engine also may stall when it is supplied with too much secondary air.

It is an object of the present invention to provide a secondary air intake system which prevents engine stall immediately after the start of deceleration and has other improved operating characteristics.

In the secondary air intake system of the present invention a first and second control pressure is supplied to an air control valve so as to gradually increase or decrease the open area of a secondary air intake passage in accordance with a measured air-fuel ratio. The second control pressure is supplied by the first pressure supply means independently of the measured air-fuel ratio when the engine is in a predetermined running state. The second control pressure is supplied by second pressure supply means to abruptly close the air control valve.

The present invention will be described in connection with a preferred embodiment shown in the accompanying drawings wherein:

FIG. 1 is a diagram showing the change in the air-fuel ratio provided by feedback control from measurement of the air-fuel ratio.

FIG. 3 is a block diagram showing the control circuit for the preferred embodiment of the secondary air intake system shown in FIG. 2.

FIGS. 4 and 5 are diagrams showing the operation of the preferred embodiment of FIGS. 2 and 3.

Figure 2:
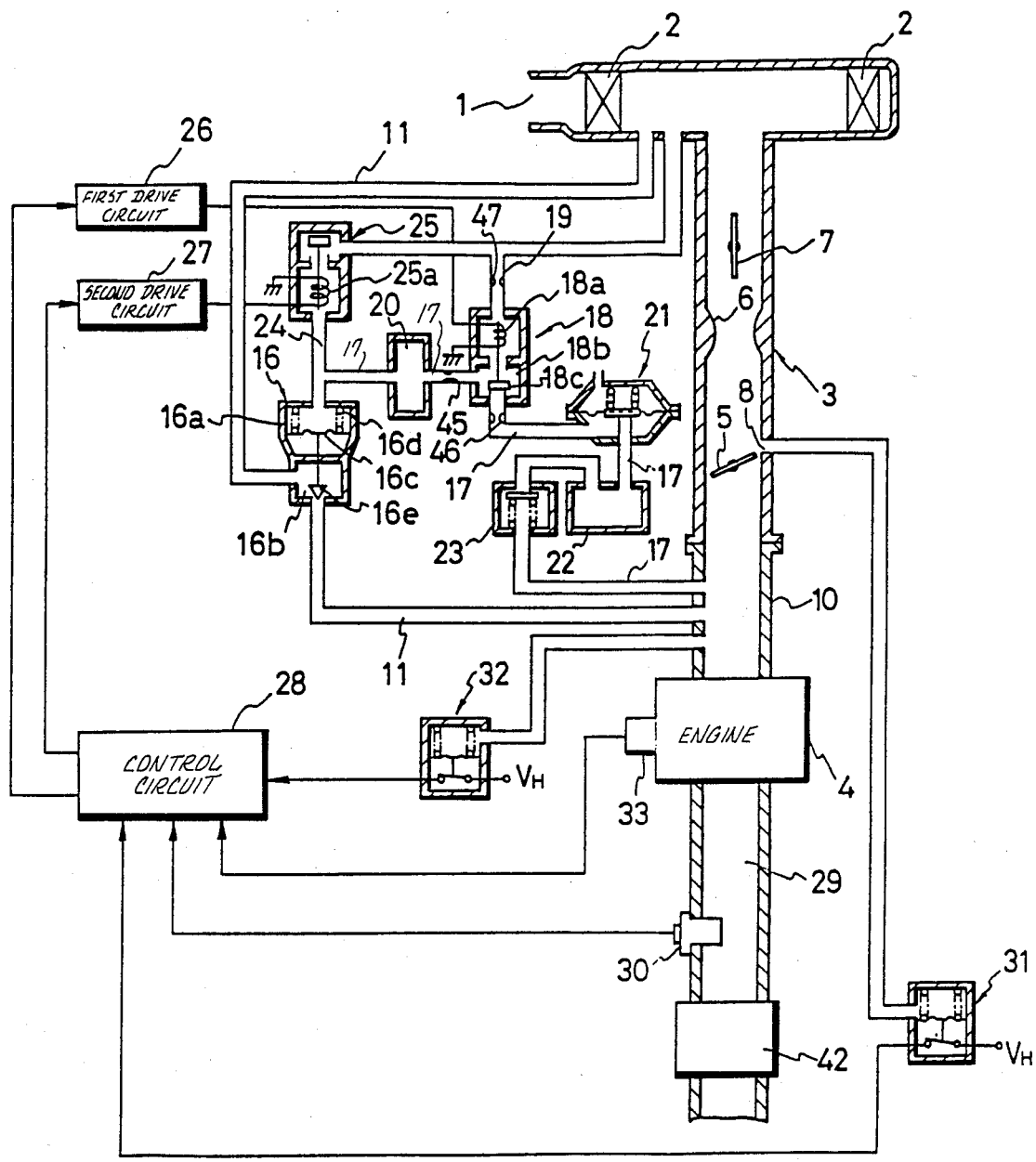
FIG. 2 is a schematic diagram showing the preferred embodiment of the secondary air intake system of the present invention.

In the secondary air intake system according to the preferred embodiment of the present invention shown in FIG. 2, primary intake air is supplied from an air intake port 1 via an air cleaner 2 and a carburetor 3 to an engine 4. The carburetor 3 is equipped with a throttle valve 5, a venturi 6 upstream of the throttle valve 5, and a choke valve 7 upstream of the venturi 6. In the vicinity of the throttle valve 5 there is formed a throttle vacuum detection port 8 which is positioned upstream of the throttle valve 5 when the throttle valve 5 is closed and downstream of the throttle valve 5 when the same is open.

A secondary air passage 11 communicates between the intake manifold 10 downstream of the throttle valve 5 and a point in the vicinity of the air discharge port of the air cleaner 2. This secondary air intake passage 11 is equipped with an air control valve 16 which includes a vacuum chamber 16$a$, a valve chamber 16$b$, a diaphragm 16$c$, a valve spring 16$d$ and a tapered valve member 16$e$. The effective area of the secondary air intake passage 11 is increased with an increase in the vacuum in the vacuum chamber 16$a$.

The vacuum chamber 16$a$ communicates with the intake manifold 10 through vacuum supply passage 17. This vacuum supply passage 17 is equipped with an electromagnetic valve 18 which includes a solenoid 18$a$, a valve chamber 18$b$ forming a part of the vacuum supply passage 17, and a valve member 18$c$ disposed in the vacuum chamber 18$b$ and coupled magnetically to the solenoid 18$a$. The electromagnetic valve 18 connects the air control valve 16 to atmosphere through atmosphere supply passage 19 when the solenoid 18$a$ is deenergized and connects the engine vacuum through supply passage 17 when the solenoid 18$a$ is energized. A surge tank 20 is positioned in the vacuum supply passage 17 at a position closer to the vacuum chamber 16$a$ than the electromagnetic valve 18. A predetermined vacuum control valve 21, a storage tank 22 and a check valve 23 also are positioned in the vacuum supply passage 17 at positions closer to the intake manifold 10 than the electromagnetic valve 18. The predetermined vacuum control valve 21 prevents the vacuum from the intake manifold 10 to the electromagnetic valve 18 from exceeding a predetermined level of vacuum $P_r$. The check valve 23 stabilized the vacuum pressure of the surge tank 20. The vacuum supply passage 17 includes orifices 45 and 46 at both the sides of the electromagnetic valve 18 and the atmosphere supply passage 19 includes an orifice 47.

The vacuum supply passage 17 may also be vented to atmosphere at its portion closer to the vacuum chamber 16$a$ than the surge tank 20 through atmosphere supply passage 24. An electromagnetic valve 25 is positioned in atmospheric supply passage 24 to close the atmosphere supply passage 24 when the solenoid 25a is energized.

The solenoids 18a and 25a are connected through first and second drive circuits 26 and 27 to a control circuit 28. The control circuit 28 is connected with an oxygen concentration sensor 30 disposed in an exhaust manifold 29. The oxygen concentration sensor 30 generates an output voltage $V_{O2}$ corresponding to the oxygen concentration in the exhaust gas. The output voltage $V_{O2}$ increases as the oxygen concentration becomes greater.

The control circuit 28 in addition to the first and second drive circuits 26 and 27 and the oxygen concentration sensor 30 also includes a $P_C$ vacuum switch 31, a $P_B$ vacuum switch 32 and an engine speed switch 33. The $P_C$ vacuum switch 31 is turned on when the level of the vacuum $P_C$ measured at the vacuum detecting port 8 is below a predetermined pressure $P_1$ or about 30 mmHg. The $P_B$ vacuum switch 32 is turned on when the level of the vacuum $P_B$ in the intake manifold 10 is below a predetermined pressure $P_2$ or about 580 mmHg.

The speed switch 33 is turned on when the engine speed is found to be above a predetermined speed of about 1,400 r.p.m. The engine speed is determined from pulses which are generated in an ignition coil (not shown). The switches 31, 32 and 33 generate high level signals at a voltage $V_H$, when they are turned on.

As shown in FIG. 3, the control circuit 28 includes a comparator 37 for comparing the output voltage $V_{O2}$ of the oxygen concentration sensor 30 through a buffer 36 with a predetermined voltage $V_r$ corresponding to the stoichiometric air-fuel ratio; an inverter 38 connected with the output of the $P_C$ vacuum switch 31; an AND circuit 39 for taking an AND between the respective output levels of the comparator 37 and the inverter 38; and an OR circuit 40 for taking an OR between the respective output levels of the $P_B$ vacuum switch 32 and the speed switch 33. The output signal of the AND circuit 39 is supplied to the drive circuit 26 whereas the output signal of the OR circuit 40 is supplied to the drive circuit 27.

The secondary air intake system operates as follows. In the control circuit 28, the air-fuel ratio is in a rich range when the output voltage $V_{O2}$ of the oxygen concentration sensor 30 is equal to or higher than the predetermined voltage $V_r$ ($V_{O2} \geq V_r$).

Therefore, the output of the comparator 37 takes a high level. When the output voltage $V_{O2}$ is lower than the predetermined voltage $V_r$ ($V_{O2} < V_r$), the air-fuel ratio is in a lean range and the output of the comparator 37 takes a low level. During ordinary operation of the engine after the engine is warm the $P_C$ vacuum switch 31 is turned off so that the output of the inverter 38 takes a high level. As a result the output level of the AND circuit 39 becomes identical to the level change of the comparator 37 such that when the output level of the oxygen concentration sensor 30 indicates that the air-fuel ratio is rich, the output of the AND circuit 39 takes the high level, which is supplied as a rich signal to the drive circuit 26. If the air-fuel ratio is lean, the output of the AND circuit 39 takes the low level, which is supplied as a lean signal to the drive circuit 26.

Since the throttle valve 5 is open during the ordinary operation of the engine, at least one of the $P_B$ vacuum switch 32 and the speed switch 33 is turned on so that the output of the OR circuit 40 takes a high level. This results in the drive circuit 27 operating to close the electromagnetic valve 25 so that the atmosphere supply passage 24 is closed.

The drive circuit 26 deenergizes the solenoid 18a in response to the lean signal to bring the electromagnetic valve 18 into an inoperative state but energizes the solenoid 18a in response to the rich signal to bring the electromagnetic valve 18 into an operative state. When the electromagnetic valve 18 is inoperative it closes the vacuum supply passage 17 and provides communication between the vacuum supply passage 17 and the atmosphere supply passage 19 at the side of the vacuum chamber 16a so that the vacuum in the vacuum chamber 16a gradually drops to move the valve member 16e of the air control valve 16 in a closing direction to close the secondary air intake passage 11. When the secondary air intake passage 11 is closed no secondary air is supplied from the secondary intake air passage 11 to the engine 4 so that the air-fuel ratio of the mixture is controlled to the rich range.

When the electromagnetic valve 18 is switched from its inoperative state to its operative state it provides communication to the vacuum supply passage 17 but closes the passage 19 to atmosphere. Therefore the vacuum chamber 16a is supplied with the vacuum $P_r$ through the orifice 46, the electromagnetic valve 18, the orfice 45 and the surge tank 20. This causes the pressure in vacuum chamber 16a to gradually approach the vacuum $P_r$ resulting in the opening of the air control valve 16 to start the flow of the secondary air to the secondary air intake passage 11.

As the vacuum in the vacuum chamber 16a approaches the vacuum $P_r$ the effective area of the air intake passage 11 is gradually increased to provide the required flow of secondary air. This results in controlling the air-fuel ratio of the mixture to the lean range since the flow of the secondary air supplied to the engine 4 is increased.

When the electromagnetic valve 18 is switched from its operative state to its inoperative state it closes the vacuum supply passage 17 but provides communication between the vacuum supply passage 17 and the atmosphere supply passage 19 at the side of the vacuum chamber 16a. Therefore, the vacuum chamber 16a is connected to atmosphere through orifice 47, electromagnetic valve 18, orifice 45 and surge tank 20. This causes the pressure in the vacuum chamber 16a to gradually approach atmosphere. This results in the effective open area of the secondary intake air passage 11 gradually decreasing to gradually reduce the flow of secondary air.

When the air-fuel ratio is controlled to the stoichiometric value an alternating rich signal and lean signal are continuously generated. Therefore, the flow of the secondary air in the secondary air intake passage 11, is gradually increased in the presence of a rich signal and is gradually decreased in the presence of a lean signal.

When the engine 4 is in the decelerating state the throttle valve 5 is closed. This causes the level of the vacuum $P_C$ in the vacuum detecting port 8 to decrease below the predetermined pressure $P_1$ resulting in a high level signal being supplied from the $P_C$ vacuum switch 31 to the inverter 38. Therefore, the output of the inverter 38 takes a low level. This low level causes the AND circuit 39 to supply a low level signal to the drive circuit 26 regardless of the output level of the comparator 37 (output level of the oxygen concentration sensor 30). The drive circuit 26 therefore interrupts the signal to the electromagnetic valve 18 similar to when the lean signal is supplied to make the electromagnetic valve 18 inoperative. This opens the electromagnetic valve 18 to connect the vacuum chamber 16a of the air control valve 16 to atmosphere and interrupts the air-fuel ratio feedback control.

When the level of the vacuum $P_B$ in the intake manifold 10 becomes sufficiently higher than the predetermined pressure $P_2$ the throttle valve 5 is closed. This also opens the $P_B$ vacuum switch 32. But, if the engine speed is higher than the predetermined value, the speed switch 33 is turned on. Therefore, the output of the OR circuit 40 is continuously held at the high level so that the electromagnetic valve 25 is maintained closed. For example, assuming that the deceleration of the engine is started at a time $t_1$, the vacuum chamber 16a is connected to atmosphere through the orifice 47, the electromagnetic valve 18, the orifice 45 and the surge tank 20. This causes the pressure in the vacuum chamber 16a to gradually approach atmosphere as shown in FIG. 4. This results in a decrease in the flow of secondary air similar to when the rich signal is supplied.

If the engine deceleration continues until the speed becomes lower than the predetermined value at a time $t_2$, the speed switch 33 is turned off so that the output of the OR circuit 40 is inverted to the low level. This causes the drive circuit 27 to open the electromagnetic valve 25. This connects the vacuum chamber 16a of the control valve 16 to atmosphere through the orifice 47, the electromagnetic valve 18, the orifice 45 and the surge tank 20. It also abruptly connects the vacuum chamber 16a of the control valve 16 to atmosphere through the electromagnetic valve 25. Therefore, the inside of the vacuum chamber 16a abruptly approaches the atmosphere from the time $t_2$ as shown in FIG. 4. This decreases the closing time for the air control valve 16 causing it to instantly close the secondary intake air passage 11.

When the engine operating state is changed from deceleration to acceleration, the level of the vacuum $P_C$ becomes higher than the predetermined pressure $P_1$. This causes the throttle valve 5 to open, and turns off the $P_C$ vacuum switch 31 thereby raising the output of the inverter 38 to the high level. Therefore, the output level of the AND circuit 39 becomes equal to the output level of the comparator 37. This supplies the rich signal to the drive circuit 26.

The supply of the vacuum $P_r$ to the vacuum chamber 16a progresses through the orifice 46, the electromagnetic valve 18, the orifice 45 and the surge tank 20. If, at this time, the engine speed is lower than the predetermined value and the level of the vacuum $P_B$ is higher than the predetermined pressure $P_2$, the atmosphere is continuously supplied from the electromagnetic valve 25 to the vacuum chamber 16a. Therefore, the vacuum $P_r$ is diluted with both that atmosphere and the residual atmosphere left in the electromagnetic valve 18 and in the surge tank 20. As a result, even if the acceleration is started at a time $t_3$ as shown in FIG. 5, the pressure in the vacuum chamber 16a is not raised to the vacuum $P_r$. Thus, the air control valve 16 is not opened so that the air-fuel ratio immediately after the start of the acceleration is shifted to the rich range.

If, at a time $t_4$ after the start of the acceleration, the engine speed reaches a value higher than the predetermined value or the level of the vacuum $P_B$ reaches a level lower than the predetermined pressure $P_2$, the electromagnetic valve 25 is closed by the drive circuit 27 to interrupt the supply of the atmosphere from the electromagnetic valve 25 to the vacuum chamber 16a. Since the vacuum chamber 16a is supplied with the vacuum $P_r$, its pressure gradually approaches the vacuum $P_r$ from the time $t_4$ as shown in FIG. 5 so that the secondary air is supplied to the engine to provide feedback control of the air-fuel ratio.

If at the start of the acceleration the engine speed is higher than the predetermined value or the vacuum $P_B$ is lower than the predetermined pressure $P_2$ the pressure in the vacuum chamber 16a gradually approaches the vacuum $P_r$ simultaneously with the start of the acceleration to provide feedback control of the air-fuel ratio.

Immediately after starting deceleration of the engine, the secondary air intake system of the present invention, provides a reduced flow rate of secondary air. This prevents poor engine operation and engine stalling caused by an excessive supply of secondary air immediately after the start of deceleration.

Also, in the secondary air intake system according to the present invention when the engine operating state is shifted from deceleration to acceleration as described, the air-fuel ratio immediately after the start of acceleration is shifted to the rich range so that the acceleration of the engine is improved.

The invention claimed is:

1. A secondary air intake system for an internal combustion engine having a primary air intake passage with a throttle valve and an exhaust system including: a secondary air intake passage communicating with the primary air intake passage downstream of a throttle valve, an air control valve disposed in said secondary air intake passage for changing the effective area of said secondary air intake passage in response to a pressure signal, means for determining an air-fuel ratio, a first control pressure source for generating a first control pressure for opening said air control valve; a second control pressure source for generating a second control pressure for closing said air control valve; and first pressure supply means for supplying said first and second control pressures so as to gradually increase or decrease the open area of said secondary air intake passage in accordance with said determined air-fuel ratio and for supplying said second control pressure independently of said determined air-fuel ratio at a predetermined engine operating state, wherein the improvement comprises second pressure supply means for abruptly supplying said second control pressure separately of said first pressure supply means in said predetermined engine operating state.

2. The secondary air intake system set forth in claim 1 wherein said predetermined engine operating state is one of the states in which the engine speed is equal to or lower than a predetermined value and in which the pressure in said intake passage is equal to or lower than a predetermined level.

3. A secondary air intake system for an internal combustion engine having a primary air intake passage with a throttle valve and an exhaust system comprising:
   a secondary air intake passage communicating with the primary air intake passage downstream of the throttle valve,
   an air control valve positioned in said secondary air intake passage for changing the open area thereof in response to a pressure signal,
   atmosphere pressure supply means for supplying atmosphere control pressure to said air control valve to abruptly close said secondary air passage, and control circuit means for sensing an engine stall condition and actuating said atmosphere pressure supply means in response to that sensed stall condition for causing said supplying of atmosphere control pressure to said air control valve.

4. The secondary air intake system defined in claim 3 wherein said control circuit means for sensing said engine stall condition includes a vacuum switch responsive to the pressure in said primary air intake passage downstream of said throttle and an engine speed switch.

5. A secondary air intake system for an internal combustion engine having a primary air intake passage with a throttle valve and an exhaust system comprising:
   a secondary air intake passage communicating with the primary air intake passage downstream of the throttle valve,
   an air control valve positioned in said secondary air intake passage, said air control valve having a vacuum operating chamber,
   a three way solenoid operated valve for providing a first control pressure and a second control pressure to operate said air control valve, and
   a two way solenoid operated valve for providing said second control pressure to operate said air control valve.

6. The secondary air intake system defined in claim 5 further including:
   control circuit means for operating said three way solenoid operated valve and said two way solenoid operated valve.

7. The secondary air intake system defined in claim 6 wherein said control circuit means includes means for abruptly opening of said two way solenoid valve during an engine decelerating state.

8. The secondary air intake system defined in claim 6 wherein said control circuit means includes an engine speed operated switch and a vacuum pressure operated switch positioned downstream of said throttle valve.

* * * * *